United States Patent [19]
Shaw et al.

[11] Patent Number: 5,961,844
[45] Date of Patent: Oct. 5, 1999

[54] PROCESS FOR THE REMOVAL OF $NO_x$ FROM A FLUID STREAM

[75] Inventors: Henry Shaw, Scotch Plains; Howard D. Perlmutter, Milburn, both of N.J.

[73] Assignee: New Jersey Institute of Technology, Newark, N.J.

[21] Appl. No.: 09/000,674

[22] Filed: Dec. 30, 1997

[51] Int. Cl.$^6$ .................................................. C02F 1/72
[52] U.S. Cl. ........................... 210/759; 210/903; 423/235
[58] Field of Search ............................... 210/758, 759, 210/903; 423/235

[56] References Cited

U.S. PATENT DOCUMENTS

| | | |
|---|---|---|
| 4,426,364 | 1/1984 | Cooper . |
| 4,564,510 | 1/1986 | Bechthold et al. . |
| 5,366,711 | 11/1994 | von Wedel et al. . |
| 5,595,713 | 1/1997 | Gohara et al. . |
| 5,637,282 | 6/1997 | Osborn et al. ........................... 423/235 |

OTHER PUBLICATIONS

Cooper and Alley, Control of sulfur oxides, in Air pollution control, 2nd ed, Waveland Press, Inc. Chapter 14.

Jahnig and Shaw, 1981, JAPCA, 31:421–8; 596–604.

Perlmutter et al, 1993, Environ Sci Technol, 27: 128–33.

*Primary Examiner*—Jay H. Woo
*Assistant Examiner*—Betsey J. Morrison
*Attorney, Agent, or Firm*—Klauber & Jackson

[57] ABSTRACT

A process is provided for removing the $NO_x$ from a fluid stream (e.g. a waste gas stream such as a flue gas stream produced during combustion). The process entails the contacting of the stream, prior to discharge into the atmosphere, with an aqueous alkaline solution containing an organic hydroperoxide such as cumenyl hydroperoxide or tert-butyl hydroperoxide. The solution has a pH of greater than 7 to about 14 which is provided by an alkali such as calcium hydroxide or calcium carbonate. The process is preferably carried out at a temperature of 50 to 95° C.

9 Claims, No Drawings

PROCESS FOR THE REMOVAL OF $NO_x$ FROM A FLUID STREAM

FIELD OF THE INVENTION

The invention relates to a process for scrubbing nitrogen oxides from a fluid stream (e.g. a waste gas stream such as a flue gas stream produced during combustion of a fuel or during the manufacture of chemical products which result in the production of nitrogen oxides ($NO_x$) in the gaseous effluent,. For the purposes of this invention, the term "fluid stream" is preferably understood to mean a "gas stream".

BACKGROUND OF THE INVENTION

An environmental concern in regard to air pollution pertains to waste gas streams containing nitrogen oxides (hereinafter referred to as $NO_x$) and sulfur oxides (hereinafter referred to as $SO_x$). Nitrogen oxides consist primarily of nitric oxide (NO) and nitrogen dioxide ($NO_2$), while sulfur oxides consist primarily of sulfur dioxide ($SO_2$) and sulfur trioxide ($SO_3$).Such streams are produced, e.g. as emissions from power generating plants, as the result of combustion of fuels containing nitrogen and sulfur compounds. Also, during the manufacture of certain chemical products, such as nitric acid and organic nitrates, effluent streams containing $NO_x$ are produced. Further, $NO_x$ are also produced by the oxidation of atmospheric nitrogen by atmospheric oxygen at the high temperatures which exist in the course of fossil fuel combustion.

The $NO_x$ and $SO_x$ are desirably removed from waste gas streams prior to discharge of the streams into the atmosphere because $NO_x$ and $SO_x$ can cause respiratory ailments such as emphysema and further can oxidize and combine with atmospheric water vapor to form oxyacids of nitrogen and sulfur. Such acids then fall to the earth as "acid precipitation" undesirably making the environment more acidic. Moreover, it is well known that $NO_x$ additionally contributes to air pollution by taking part in the formation of photochemical smog.

While it is possible to avoid or at least minimize emissions of $SO_x$ and, to a lesser extent, emissions of $NO_x$ since much of the $NO_x$ is produced from the atmospheric components of air, by using clean fuels such as light fuel oil or natural gas, such fuels are relatively expensive. It would be most desirable if methods could be employed to remove the $NO_x$ and $SO_x$ produced using cheaper power-generating fuels such as coal and heavy fuel oil using conventional types of flue gas desulfurization units.

Any method used to remove $NO_x$ and $SO_x$ from waste gas streams must not only result in reduction of the $NO_x$ and $SO_x$ to acceptable levels, but must also be cost effective from the standpoint of capital costs as well as operating costs. Processes are known for removal of $NO_x$ and $SO_x$ from waste gas streams which have low operating costs in the sense that relatively cheap chemicals are used for sorbing the $NO_x$ and $SO_x$. As a general rule, however, such processes entail relatively high capital costs.

Coal may be combusted to generate power and the resultant flue gas stream may be scrubbed with an aqueous alkaline solution to sorb the $SO_x$ present in the stream. However, such solution will have little effect on reducing the $NO_x$ present in the stream to acceptable levels. As a result, the $NO_x$ must be reduced to acceptable levels by combustion control equipment which is relatively expensive. Moreover, controlling the combustion parameters so as to minimize the formation of $NO_x$ in the waste gas stream frequently results in a diminution of the maximum combustion efficiency from the standpoint of power generation.

It would be desirable if a process could be provided which permits conventional aqueous alkaline solution scrubbing units to be utilized for removal of $NO_x$ from waste gas streams without requiring any expensive modifications to such units and without affecting the capability of the units to quantitatively absorb the $SO_x$ present in the waste gas stream. It would be most desirable from the perspective of maintaining low operating costs if any additive used in such units for sorbing the $NO_x$ was not parasitically consumed by the presence of the $SO_x$ present in the waste gas stream, i.e. the $SO_x$ present in the stream would quantitatively dissolve in the liquid scrubbing solution and would not react with the additive used for sorbing the $NO_x$ present in the stream.

SUMMARY OF THE INVENTION

A class of additives has now been discovered which may be used in conventional aqueous alkaline scrubbing units which is quite cost effective from the perspective of both capital costs and operating costs. The additive class comprises an organic hydroperoxide and it may be employed in such units without any expensive modifications to the units. The additive will selectively oxidize the $NO_x$ to nitrate (and nitrite) ions without any significant reaction with the $SO_x$ present in the waste gas stream. The result is that $NO_x$ as well as $SO_x$ in the waste gas stream are reduced (absorbed) to acceptable levels for discharge of the treated stream to the atmosphere while at the same time permitting the combustion of cheaper, relatively "dirty" fuels such as coal and heavy fuel oils to be combusted under conditions of peak combustion efficiency.

DETAILED DESCRIPTION OF THE INVENTION

The invention pertains to a process for the removal of $NO_x$ from a fluid stream which comprises contacting the stream with an organic hydroperoxide in the presence of an aqueous alkaline solution. The fluid stream is typically a waste gas stream such as that emitted from the combustion of a fuel such as coal or a heavy fuel oil, after its energy has been extracted in the course of power production.

Suitable organic hydroperoxides include cumenyl hydroperoxide, tert-butyl hydroperoxide, p-menthanyl hydroperoxide and pinanyl hydroperoxide and the like, all of which are commercially available. The preferred hydroperoxides are cumenyl hydroperoxide and tert-butyl hydroperoxide. The concentration of the organic hydroperoxide should be such that the molar ratio of organic hydroperoxide to $NO_x$ present in the fluid stream is in the range of about 1 to 1 to about 2 to 1, preferably about 1 to 1.

The aqueous alkaline solution will have a pH of greater than 7 to about 14, preferably 9 to 12. Typically, the alkali present in the aqueous alkaline solution will be a salt such as NaOH, KOH, $Na_2CO_3$, MgO, but is preferably a calcium salt such as calcium hydroxide (lime) or calcium carbonate (limestone). The alkali agent will typically be present in an amount of about equimolar or greater with respect to the organic hydroperoxide. Preferably, the contacting of the fluid stream with the organic hydroperoxide is carried out at a temperature of about 20 to about 120° C., preferably 50 to 95° C.

After the process has been carried out, the $NO_x$ present in the fluid stream will have been oxidized to nitrate and nitrite ions which in turn will combine with the alkali to yield nitrate salts. In a similar vein, the $SO_x$ present in the fluid stream will be absorbed by the solution, i.e. it will quantitatively dissolve in the solution without reacting with the organic hydroperoxide. The nitrate and sulfate salts may then be recovered and re-used for industrial applications or otherwise disposed of.

The following examples are included for illustrative purposes and are not intended to limit the scope of the invention.

EXAMPLES

A solution of 2 liters of water containing 1.07 g sodium hydroxide and 32.65 g tert-butyl hydroperoxide was utilized in these examples. The solution was well-mixed and maintained at 80° C. The solution was contacted with a nitrogen gas stream containing 1050 ppm NO. The gas stream was bubbled through the solution of 1.0 liter/minute. It was found that 100% of the NO in the gas stream was absorbed until all of the tert-butyl hydroperoxide was consumed. The total nitrogen from the NO that was absorbed corresponded to the total amount of inorganic nitrates and nitrites found in the aqueous solution. The tert-butyl hydroperoxide was converted to benign carbon compounds such as tert-butyl alcohol and trace amounts of isobutylene.

In the course of repeating the above example at different pH levels and temperatures, it was found that there was a trade-off between the pH and the scrubbing temperatures. It was found that as the pH was lowered, a higher scrubbing temperature was required to obtain 100% absorption of NO. For example, complete NO absorption was obtained with a solution having a pH of 9.75 at a scrubbing temperature of 90° C. as well as with a solution having a pH of 13 at a scrubbing temperature of 59° C.

What is claimed is:

1. A process for the removal of $NO_x$ from a fluid stream which comprises contacting the stream with an aqueous alkaline solution containing an organic hydroperoxide, wherein the solution has a pH of greater than 7 to about 14.

2. The process of claim 1, wherein the organic hydroperoxide comprises cumenyl hydroperoxide.

3. The process of claim 1, wherein the organic hydroperoxide comprises tert-butyl hydroperoxide.

4. The process of claim 1, wherein the solution has a pH of 9 to 12.

5. The process of claim 1, wherein the solution contains a calcium salt selected from the group consisting of calcium hydroxide and calcium carbonate.

6. The process of claim 1, wherein the organic hydroperoxide is present in a concentration such that the molar ratio of organic hydroperoxide to $NO_x$ present in the fluid stream is in the range of about 1 to 1 to about 2 to 1.

7. The process of claim 6, wherein the ratio of organic hydroperoxide to $NO_x$ present in the fluid stream is about 1 to 1.

8. The process of claim 1, wherein the contacting of the fluid stream with the aqueous alkaline solution is carried out at a temperature of about 20 to about 120° C.

9. The process of claim 8, wherein the contacting of the fluid stream with the aqueous alkaline solution is carried out at a temperature of 50 to 95° C.

\* \* \* \* \*